Figure 1:
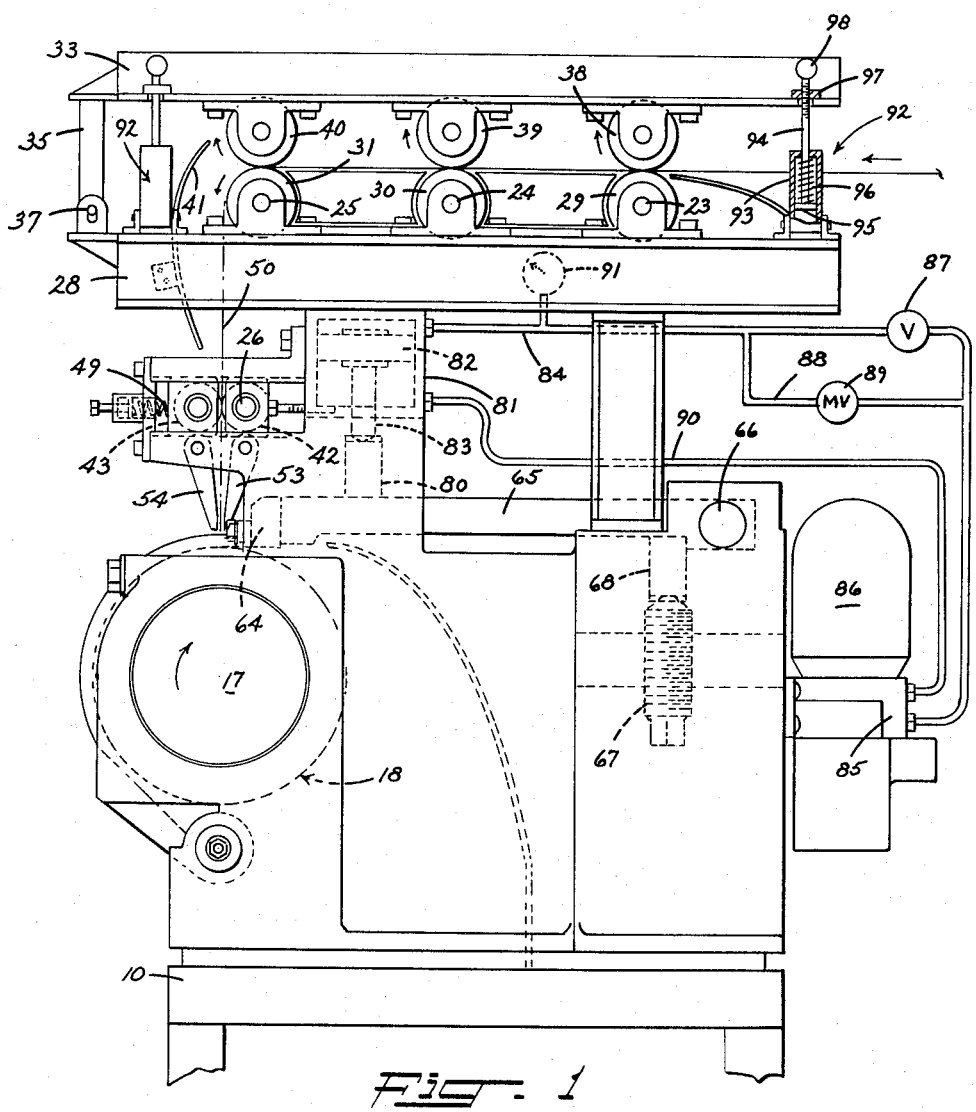

Nov. 29, 1960 H. W. HEMKER ET AL 2,961,909
STAPLE FIBER CUTTING MACHINE WITH STATIONARY BLADE
DEFLECTED TOWARD ROTARY CUTTING BLADES
Filed March 11, 1958 3 Sheets-Sheet 1

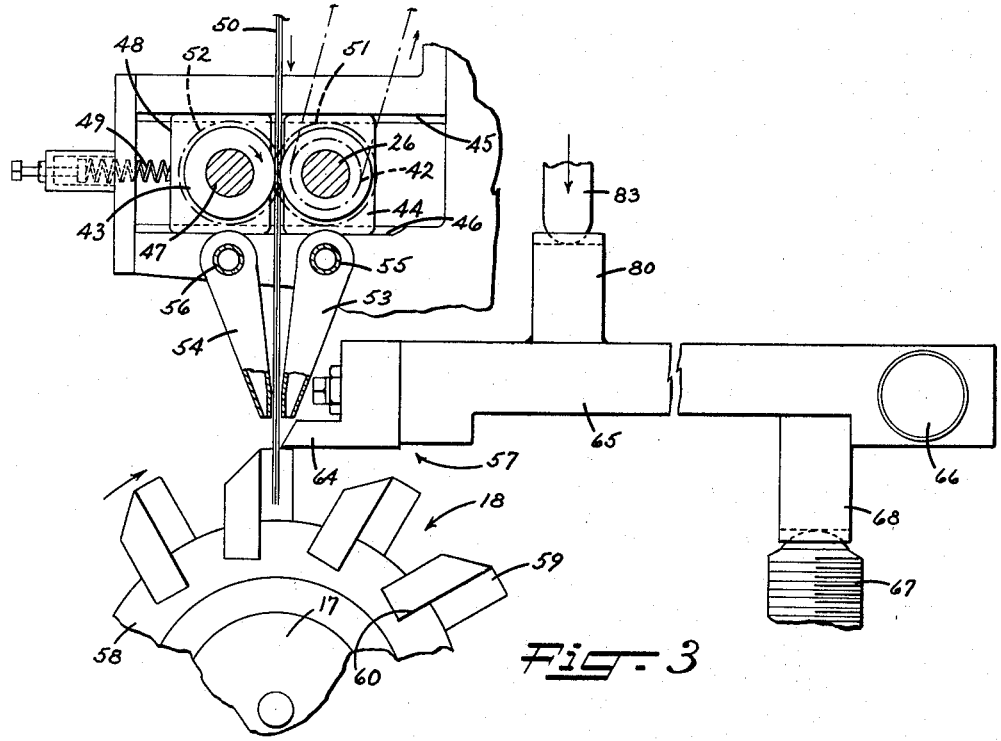
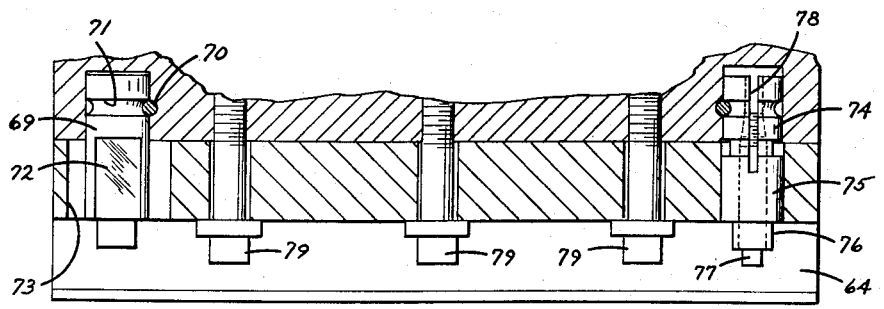
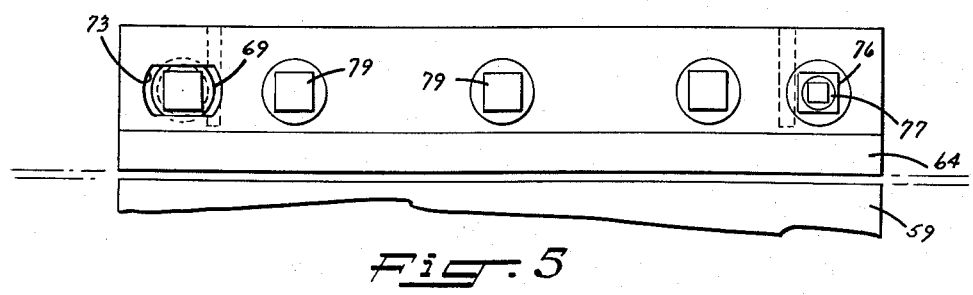

2,961,909

STAPLE FIBER CUTTING MACHINE WITH STATIONARY BLADE DEFLECTED TOWARD ROTARY CUTTING BLADES

Herman W. Hemker, West Chester, Carl E. Herschel, Newtown Square, and Irvin Wizon, Swarthmore, Pa., assignors to American Viscose Corporation, Philadelphia, Pa., a corporation of Delaware Filed Mar. 11, 1958, Ser. No. 720,580

5 Claims. (Cl. 83—349)

The present invention relates to an improved method and apparatus for cutting bundles or tows of continuous filaments into staple fibers.

It is an object of this invention to provide a means for cutting large tows of continuous filaments into staple fibers of a precisely predetermined length.

It is another object to provide an apparatus for cutting large tows into staple fibers wherein the lengths of the staple fibers may be varied at will.

It is still another object to provide a staple fiber cutting machine which is particularly adapted for use in cutting a tow as the tow leaves a continuous spinning machine and in furtherance of this objective the invention provides means for feeding the tow to a cutting station at a constant speed regardless of slight variations in the speed of the spinning machine.

It is a further object of the invention to provide a staple fiber cutter which may be easily sharpened and readily adjusted to compensate for wear of the cutting elements.

Other and further objects, features and advantages of the invention will become apparent as the description of a preferred embodiment thereof proceeds.

Figure 2:
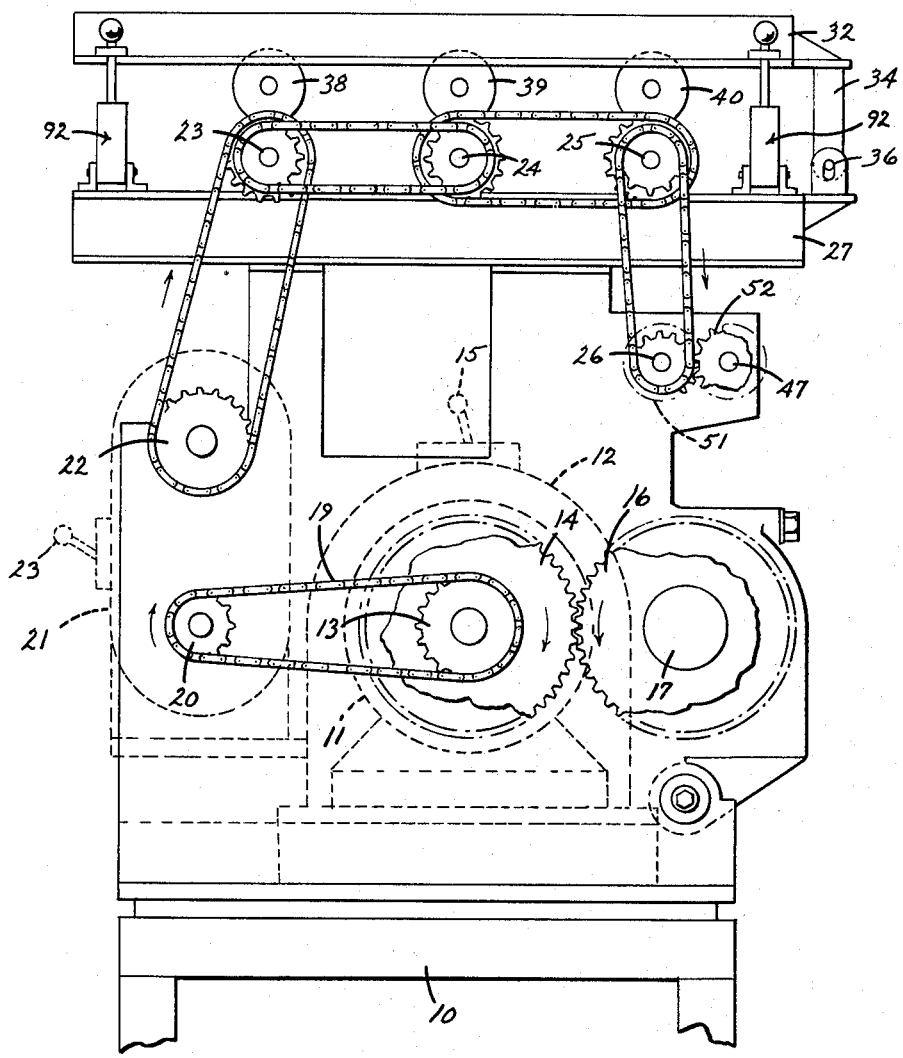

Referring now to the drawings:

Fig. 1 is a diagrammatic side elevational view of a staple fiber cutting apparatus capable of carrying out the method of the present invention, Fig. 2 is a diagrammatic side elevation of the other side of the machine and showing the means for driving the various elements, Fig. 3 is a side elevational view showing certain details of the cutting mechanism, Fig. 4 is a sectional view showing one of the means for adjusting the fixed blade of the cutter, and Fig. 5 is an elevational view of the parts shown in Fig. 4 and illustrating diagrammatically the means for positioning the fixed cutting blade in parallel relation to the blades of the rotary cutting member.

As best shown in Fig. 2 the apparatus comprises a framework 10 supporting a motor 11, the drive shaft of which is connected through a speed change transmission 12 to a sprocket wheel 13 and to a drive gear 14. A suitable handle 15 is provided for adjusting the speed change transmission 12 to regulate the speed of the sprocket 13 and drive gear 14. The drive gear 14 is meshed with a gear 16 fixed to a rotatably mounted shaft 17 to which is also fixed the rotary cutting member generally indicated in Figs. 1 and 3 at 18.

The sprocket 13 is connected by a sprocket chain 19 to an input sprocket drive 20 of a speed change device 21 having an output sprocket 22. A suitable control knob 23 is provided for regulating the output speed of the speed change device 21. The output sprocket 22 is connected by means of chains and sprockets in a manner which is readily apparent in Fig. 2 to four feed roll shafts 23, 24, 25, and 26, the shafts 23, 24, and 25 being driven at identical speeds and the shaft 26 being driven at a slightly higher speed, for a purpose to be presently explained.

The shafts 23, 24, and 25 are mounted in bearings carried by a pair of beams 27 and 28 constituting part of the framework of the machine, and feed rolls 29, 30, and 31 are secured to said shafts respectively. An upper pair of beams 32 and 33 are pivotally connected through elements 34 and 35 and loose pivots 36 and 37 to the beams 27 and 28 and said upper pair of beams carry bearings which rotatably support idler feed rolls 38, 39, and 40 adapted to cooperate respectively with the driven feed rolls 23, 24, and 25. Four identical tensioning devices 92 are provided for holding the upper feed rolls under the described tension. One of these devices is shown in detail in the upper right of Fig. 1 and comprises a cylinder 93 pivotally mounted upon the beam 28. A rod 94 is slidable within the cylinder and has secured to its lower end a washer 95 between which and the upper closed end of the cylinder is mounted a spring 96 urging the rod downwardly. A nut 97 is threaded on the rod 94 so that it may be adjusted along said rod and said rod is provided with an operating knob 98. After the upper feed roll supporting beams 32 and 33 are swung into position, the tensioning devices 92 are swung into position so that the adjustable nuts 97 thereof engage said beams and thus hold the upper feed rolls against the lower feed rolls under spring tension.

It has previously been mentioned that the present machine is particularly adapted for use with large tows as the tows come from a continuous spinning machine. While artificial filament spinning machines produce continuous filaments at a substantially constant rate, there are, nevertheless, momentary variations in the speed of such machines and one of the objects of the feed rolls above described is to cause the tow to pass through the cutting machine at an absolutely constant rate because, as will presently become apparent, the speed of the tow through the cutting apparatus is one of the factors which determines the length of the staple fibers to be cut from the tow. As the tow comes from the spinning machine it contains a substantial amount of water and while it is desirable for the tow to be moist at the time it is cut, there is a particular optimum amount of water which is desirable and by proper adjustment of the spacing between the feed rolls all except this optimum amount of water is removed from the tow. As the tow comes from the spinning machine it is more or less tubular in configuration and such a tow is difficult to cut, and particularly to cut in such a manner that all filaments will be cut to the same length, and thus another function of the feed rolls is to iron out or flatten the tow into a ribbon-like formation.

For putting the tow under tension in order to straighten the filaments, a pair of feed rolls 42 and 43, see Figs. 1 and 3, are provided. The feed roll 42 is secured to the above referred to driven shaft 26 which is mounted at its ends in a pair of blocks 44 slidably mounted in guides 45 and 46. The roller 43 is mounted on a shaft 47 rotatable in a pair of bearing blocks 48 slidable in the guides 45 and 46 and urged by a spring 49 to a position wherein the tow indicated at 50 is grasped and fed by this pair of feed rollers. As indicated in Fig. 1 the bite of the feed rollers 42 and 43 is directly below the periphery of the upper feed roller 31 so that the tow is being fed vertically downward by the feed rollers 42 and 43. As the tow passes beyond the upper horizontal feed rolls it is initially deflected downwardly into the feed rolls 42 and 43 by a curved deflecting plate 41.

It is difficult to get the tow started between the feed rolls 42 and 43 if only one of them is driven, and to provide a positive drive for both feed rolls the shafts 26 and 47 to which the feed rolls are secured are provided with intermeshing gears 51 and 52, respectively, so that the shaft 47 is driven by the shaft 26 and at the same speed. In order to bring about a proper meshing of the teeth of these gears, suitable spacer elements, not shown, are provided between the bearing blocks 44 and 48 so that they will not be moved by spring 49 into such close proximity as to interfere with the proper operation of said gears.

As the tow 50 passes downward from the feed rolls 42 and 43 it passes between the lips of a pair of downwardly directed aspirators 53 and 54. Compressed air fed from a suitable source is supplied to the aspirators 53 and 54 through orifices in pipes 55 and 56. The rapid movement of air through the lips creates a low pressure area therebetween which sucks the tow downward and by impinging against the opposite sides of the tow in a downward direction the air keeps the tow taut and positions it accurately with respect to the cutting station. By using the aspirators to actually position the tow at the point where it is to be cut it is possible to remove the feed rolls 42 and 43 from close proximity to the cutting station and thus facilitate the safe removal of any broken filaments which may become wrapped about the feed rolls from time to time. Also, the lips of the aspirators may be positioned closer to the cutting station than could the bite of the feed rolls and thus said aspirators give better control over the position of the tow and prevent build up of cut filaments on the face of the fixed blade.

The cutter comprises the aforementioned rotary cutting member 18 and a stationary cutting member generally indicated at 57. The rotary cutting member 18 consists of a drum member 58 secured to the shaft 17 and extending slightly angularly lengthwise of said drum are a plurality of blades or knives 59. These knives are fixedly secured within slots 60 provided in the surface of the drum 58. Since there are thus no individual adjustments of the blades 59, all of said blades may be sharpened to the same degree on a lathe while said blades are attached to the drum 58.

The stationary cutting member 57 comprises an anvil blade 64 adjustably secured to one end of a beam member 65 which is pivotally mounted in the framework of the machine on trunnions 66 formed integrally therewith. A low pitch self-locking screw 67 bears against a load-distributing bumper element 68 secured to the underside of the beam 65 at a point near the pivot of the trunnions 66 and such screw provides a means for swinging the beam 65 to a position wherein the edge of the anvil blade 57 is in approximate alignment with the cutting edges of the rotary blades 59.

In order to bring about parallelism between the cutting edges of the anvil blade 57 and the rotary blades 59, the mechanism best shown in Figs. 4 and 5 is provided. This mechanism comprises a cylindrical stud 69 extending outwardly from the end of beam member 65 and rotatably secured to said beam member as by means of a pin 70 extending into a bore provided in the top of the beam and engaged within a circular groove 71 cut into the stud. The portion of the stud extending outwardly of the beam is cut away on opposite sides to provide flattened portions 72 whereby said stud fits snugly within a slot 73 extending through one leg of the angularly shaped anvil blade 64. A cylindrical stud 74 having an eccentric portion 75 is rotatably mounted in the beam member 65 and in a manner similar to the stud 69 and said eccentric portion 75 fits snugly within a bore provided adjacent that edge of the anvil blade 64 opposite to the slot 73. The stud 74 is provided with a squared end portion 76 by means of which it may be rotated to cause the eccentric portion 75 to move the end of anvil blade 64 up or down to position the cutting edge of said blade in parallel relation to the cutting edge of one of the blades 59 of the rotary cutter, this condition being illustrated in Fig. 5. After the desired parallelism is obtained a screw 77 is inserted into the end of the sud 74 to expand the cylindrical portion thereof into tight engagement with the bore provided in the beam member 65 and lock the eccentric portion 75 in its adjusted position, the stud 74 being split as indicated at 78 to permit the screw 77 to bring about this necessary expansion. After the anvil blade 64 is thus positioned parallel to the blade 59, bolts 79 are inserted to hold it in this position.

In order to obtain a clean cut of all of the filaments making up the tow, the cutter is so adjusted that the cutting edges of the blades 59 actually contact the cutting edge of the anvil blade 64. For the best cutting and longest wear it is essential that contact between blades 59 and 64 be very accurately adjusted and that the same degree of contact be maintained for a substantial period of time. Even though the pitch of the screw 67 is quite low, this screw is not relied upon for the final adjustment of the position of the anvil blade because even if the desired accuracy could be initially obtained there would be inherent in the bearings of the trunnions 66 enough play or looseness to allow the anvil blade to be thrown out of adjustment due to the continuous pounding of the blades 59 against the quite large and tough tow 50 and against the anvil blade itself.

To attain the final positioning of the anvil blade 64 the beam member 65 carrying said blade is put under stress so as to deflect downwardly that end of the beam carrying the anvil blade. The beam member 65 has secured to the upper portion thereof, between the load distributing bumper 68 and the anvil blade, a load distributing member 80 and by applying pressure to the member 80 the beam 65 is deflected, the trunnions 66 and bumper 68 serving as a cantilever support for said beam.

Pressure may be applied to the member 80 by mechanical means such as a screw but it is preferable to employ hydraulic means for this purpose. Thus a cylinder 81 is secured to the framework of the machine and operating within said cylinder is a piston 82 having a piston rod 83 which bears against the upper edge of the load distributing member 80. Communicating with the interior of the cylinder 81 above the piston is a fluid conducting line 84 leading from a fluid supply tank 85, and a suitable pump 86 is employed for pumping fluid from the supply tank 85 to the upper portion of the cylinder. A valve 87 in the line 84 is normally closed and said valve is shunted by a line 88 containing a valve 89 which has a micrometer control whereby the movement of fluid through the line 84 may be very precisely regulated. A second line 90 connects the lower portion of the cylinder 81 to the supply tank 85 and by reversing the operation of the pump 86 fluid can be pumped through this line when it is desired to relieve the pressure on the beam 65, the valve 87 being opened at that time to permit free flow of fluid through the line 84. Normally, however, the line 90 does not function and the piston 82 is forced downwardly by the pressure in the line 84. A gauge 91 indicates the pressure in the line 84.

The relationship between the deflection of the end of the beam 65 carrying the anvil blade 64 and the pressure in the line 84 can readily be determined empirically and once this has been established, the cutting edge of the anvil blade 64 may be lowered by precisely determined amounts by increasing the pressure as shown on the gauge 91 by the number of pounds required to bring about the desired additional deflection of the beam 65. The desired pressure may be maintained in the line 84 by shutting both valves 87 and 89 or the pump 86 and reservoir 85 may be part of a suitable commercial hydraulic power unit which has the ability of maintaining a constant pressure in the line.

The positioning of the anvil blade 64 by deflection of the beam 65 in the manner above described not only gives an extremely precise control but provides a means for maintaining said blade in the adjusted position for an indefinite period of time due to the fact that the inherent looseness in the bearings of trunnions 66 is taken up by the stressing of the beam.

Among the features which cause each filament of the tow to be cut to exactly the same length as all other filaments is the cutting of the tow after it has been flattened into ribbon form rather than in the rope-like form with which said tow comes from the spinning machine. It is important to maintain control of the tow right up to the very moment of cutting, and contributing to this control are the lips 53 and 54 and also contributing is the fact that the tow is moving vertically downward at the time it is cut. The feeding of the tow directly toward the axis of the rotary cutting member also contributes to equilength cutting of all of the filaments. The particular length of cut of course depends upon the speed of the rotary cutter 18 and this may be regulated as previously described. Should it be desired to cut fibers of varying lengths, the rotary cutter may be so constructed that the knives 59 are spaced unequal distances apart, or any number of known means may be provided to intermittently vary the speed of the rotary cutter.

Having thus described the invention and a preferred embodiment thereof, what is claimed is:

1. Apparatus for cutting a tow into fibers of precisely predetermined length comprising a rotary cutting member mounted for rotation about a horizontal axis, said cutting member comprising a drum having a plurality of blades extending outwardly from the surface thereof, means for rotating said drum, an anvil blade for cooperating with the blades of said rotary cutting member, a cantilever beam on the free end of which said anvil blade is mounted, screw means for adjustably positioning said cantilever beam so that said anvil blade is approximately tangentially aligned with the blades of said rotary cutting member, separately actuated means acting on said beam between said screw means and the free end thereof, said separately actuated means straining said cantilever beam and deflecting the free end thereof toward the axis of said rotary cutting member so as to position said anvil blade in precise tangential relation with the blades of said rotary cutting member, the internal forces in said beam tending to counteract the deflection and move the anvil blade away from the axis of said rotary cutting member and out of tangential relation, and feeding means for squeezing a tow of continuous filaments into ribbon-like form and feeding it into position to be cut by the co-operating blades.

2. Apparatus for cutting a tow into fibers of precisely predetermined length comprising a rotary cutting member mounted for rotation about a horizontal axis, said cutting member comprising a drum having a plurality of blades extending outwardly from the surface thereof, means for rotating said drum, a pivotally mounted beam member mounted on an axis parallel to the axis of said rotary cutting member, supporting means for holding said beam member in cantilever fashion with a free end extending generally horizontally, an anvil blade mounted on the free end of said beam member, said supporting means being adjustable whereby said beam member may be swung through a vertical arc to roughly locate said anvil blade in position to cuttingly cooperate with the blades of said rotary cutting member, and hydraulically operated means bearing against said beam member near the free end thereof, said hydraulically operated means stressing said beam and deflecting the free end thereof toward said rotary cutter so as to precisely locate said anvil blade in position to cooperate with the blades of said rotary cutting member, the stresses in said beam tending to move said anvil blade out of cutting position.

3. Apparatus for cutting a tow into fibers of precisely predetermined length comprising a rotary cutting member mounted for rotation about a horizontal axis, said cutting member comprising a drum having a plurality of blades extending outwardly from the surface thereof, means for rotating said drum, a beam member pivotally mounted on an axis parallel to the axis of rotation of said rotary cutting member, an anvil blade secured to a free end of said beam member, adjustable holding means for maintaining said beam member cantilever style in a substantially horizontal plane, said adjustable holding means facilitating the placement of the free end of said beam member at a position wherein said anvil blade is roughly tangentially aligned with the blades of said rotary cutting member, separately actuated means straining said beam member and deflecting the free end thereof toward said rotary cutting member to precisely tangentially position said anvil blade with respect to the blades of said rotary cutting member, said last-mentioned means comprising a hydraulic cylinder and piston the piston of which bears against said beam member near the free end thereof, and means for regulating the pressure in said cylinder to control the deflection of said beam member.

4. Apparatus for cutting a tow into fibers of precisely predetermined length comprising a rotary cutting member, said cutting member comprising a drum having a plurality of blades extending outwardly from the surface thereof, means for rotating said drum, a beam member having a pivotally adjustable end and a free end, an anvil blade mounted on the free end of said beam, means for adjusting the adjustable end of said beam so as to locate said anvil blade in approximate tangential alignment with the blades of said rotary cutting member but clear of the path of rotation thereof, and separately actuated means acting on said beam member between the pivotally adjustable end and the free end thereof, said separately actuated means straining said beam and deflecting the free end thereof toward the axis of said rotary cutting member so as to position said anvil blade in a precisely tangential relation with the blades of said rotary cutting member, the internal forces in said beam tending to counteract the deflection and move the anvil blade away from the axis of said rotary cutting member and out of alignment.

5. Apparatus for cutting a tow into fibers of precisely predetermined length comprising a rotary cutting member, said cutting member comprising a drum having a plurality of blades extending outwardly from the surface thereof, means for rotating said drum, a beam having a pivotally adjustable end and a free end, an anvil blade mounted on the free end of said beam, means for adjusting the adjustable end of said beam so as to locate said anvil blade in approximate tangential alignment with the blades of said rotary cutting member but clear of the path of rotation thereof, separately actuated means acting on said beam between the pivotally adjustable end and the free end thereof, said separately actuated means straining said beam and deflecting the free end thereof toward the axis of said rotary cutting member so as to position said anvil blade in a precisely tangential relation with the blades of said rotary cutting member, the internal forces in said beam tending to counteract the deflection and move the anvil blade away from the axis of said rotary cutting member and out of alignment, and said last-mentioned means being so constructed and arranged as to prevent the free end of said cantilever beam from returning to its undeflected position.

References Cited in the file of this patent

UNITED STATES PATENTS

| | | |
|---|---|---|
| 1,515,377 | White | Nov. 11, 1924 |
| 2,768,689 | Ewing | Oct. 30, 1956 |